June 28, 1960  G. A. KERR  2,942,458
HARDNESS TESTER

Filed Oct. 17, 1956  2 Sheets-Sheet 1

INVENTOR.
Gordon A. Kerr.
BY Robert L. Kahn
Attorney.

June 28, 1960  G. A. KERR  2,942,458
HARDNESS TESTER
Filed Oct. 17, 1956  2 Sheets-Sheet 2

INVENTOR.
Gordon A. Kerr.
BY
Robert L. Kahn
Attorney.

2,942,458

HARDNESS TESTER

Gordon A. Kerr, 543 Woodbine, Oak Park, Ill.

Filed Oct. 17, 1956, Ser. No. 616,397

1 Claim. (Cl. 73—82)

This invention relates to a hardness tester of various materials and particularly of metals and alloys. The principle utilized in carrying out this invention is similar to the well known Brinell tester. As is well known, Brinell and Rockwell testing utilize a rounded, hardened steel member as a ball having predetermined dimensions for creating an indentation in the test sample when subjected to a predetermined force.

Variation based on the Brinell test are known. For example, one variation involves the use of a bar of known hardness. A hardened steel ball is disposed between the bar and sample. A force on the bar causes the steel ball to make indentations in the bar as well as in the sample. By comparing the relative diameters of the impressions, the hardness of the sample in terms of the known hardness of the bar may be determined.

The various means for testing the hardness, according to Brinell, require the use of some force or pressure upon the test ball or rounded member. It is highly desirable that a force be created in a simple manner for Brinell testing.

I have discovered a novel means for Brinell testing utilizing the explosive characteristics of a measured quantity of explosive. In particular, I have discovered that a cartridge generally similar to the cartridges used in small firearms and in stud drivers is well adapted for making a Brinell test. As is well known, guns are available for use in driving studs and other small steel members into concrete, wood, steel and the like. Such devices utilize cartridges and generally resemble a pistol in that the cartridge is retained in a suitable block and is fired by suitable means. The gases released upon the explosion of the material in the cartridge functions as propellants for the stud or other article to be shot into position.

I have discovered that by using an explosive cartridge having a measured quantity of powder that the gases released by the explosion may be used to create the force for hardness testing. The forces created by separate explosions are sufficiently alike so that within the limits of accuracy of hardness testing, it is possible to obtain accurate results.

In general, my invention contemplates the use of gases released in the explosion of any suitable material and particularly of explosives for creating a measured force for testing the Brinell hardness of a material. In accordance with this present invention, the explosion may be utilized to drive a rounded ball or rounded member into a given sample being tested. The size of the indentation in the given sample will be a direct function of the hardness of the sample and the hardness can be readily computed. It is also possible to utilize the explosive force to press a test bar of known hardness against a steel ball resting upon the sample to be tested and to measure the hardness by a comparison of the dimension in the sample and test bar. Inasmuch as the force created by the explosion of a measured quantity of a material under controlled conditions is constant within close limits, the direct type of Brinell testing wherein the ball or member with a rounded tip is forced into the sample may be utilized.

The comparison of indentations adds some complications which are unnecessary in the use of the new apparatus. It is understood however, that the new apparatus may be used for both the direct and indirect testing of the Brinell hardness.

In general, the same means embodying the present invention may be used conveniently in both direct and indirect kinds of testing. For the direct testing, a ball or member having a rounded tip of predetermined diameter of suitable hardness may be used in a suitable gun so that the ball or rounded member is driven or forced against the surface of the sample being tested under a predetermined force.

In general, the force required for testing will be less than the force required to drive the studs into steel or concrete. However, the force required for driving the ball or stud in a test may have to have one or a number of predetermined values depending upon the nature of the material being tested. As an example, there is a great difference in hardness between steel and brass. Thus in accordance with the invention different sizes of cartridges will be required for testing different materials. As is well known, different size cartridges are now provided for stud drivers depending upon the kind of stud, length and the material into which it is being driven.

The same gun may be used for making an indirect Brinell test where a steel ball is disposed between one member whose hardness is known and another member whose hardness is to be determined. For making the latter type of test, a stud driver may be utilized, the explosion being directed against one of the two members on opposite sides of the ball. It is also possible to use a conventional stud as a projectile against one of the two members, on opposite sides of the steel ball. In such case, the stud is simply used as a hammer for applying a force.

In order that the invention may be understood it will now be disclosed in connection with drawings illustrating exemplary embodiments. It is understood that variations may be made without departing from the scope of the invention except as defined by the appended claims.

Referring to the drawings, Figure 1 shows a sectional elevation of one form of the invention, the explosion generating means being shown in block form.

Figure 1:
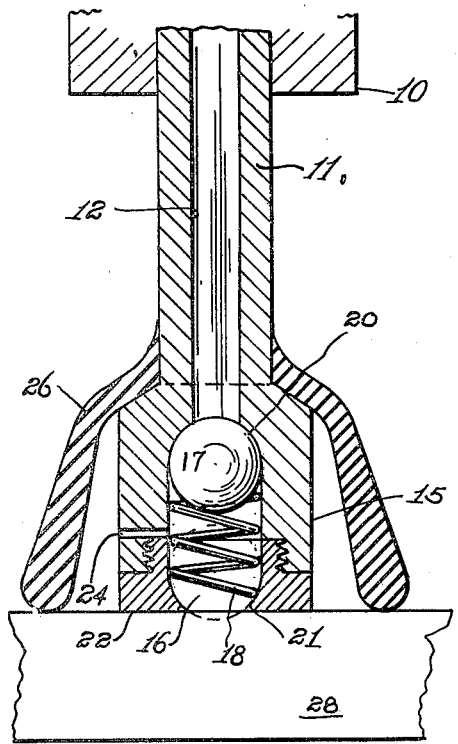

The means for generating an explosion under controlled conditions may assume a variety of forms and such means are well known in industry in connection with driving studs, pins, rivets and the like into various materials such as concrete, wood and metal. As examples of guns useful for such purposes, reference is made to United States Patent 2,470,117 issued May 17, 1949 to Temple and Patent 2,645,772 issued July 21, 1953 to Walker. These patents are merely exemplary of guns which may be adapted for use in connection with the present invention. Since the present invention is not concerned with the details of the gun, the gun itself is indicated by block 10. Gun 10 has an accessory, or as an integral part thereof, barrel 11. Barrel 11 has bore 12, the barrel terminating in enlarged end portion 15. End portion 15 has chamber 16 formed therein, this chamber communicating with bore 12. Disposed within chamber 16 is hardened steel ball 17 maintained in position against the end of bore 12 by coil spring 18.

Chamber 16 has top end 20 adjacent the end of bore 12 rounded to accommodate ball 17. Chamber 16 at the end of enlarged portion 15 is also rounded at 21. Enlarged portion 15 is just long enough so that rounded portion 21 will permit a portion of ball 17 to project beyond the end face 22 of enlarged portion 15. Enlarged portion 15 is provided with gas vent 24 connecting chamber 16 with atmosphere. The location of gas vent 24 is such that the explosive gases may escape from chamber 16 when ball 17 is approaching bottom curved portion 21. In addition to escape vent 24, gun 10 is usually provided with a safety gas vent to limit the explosive force.

Rubber skirt 26 may be provided around enlarged portion 15 as a safety precaution. Enlarged portion 15 may be made in two parts suitably threaded so that ball 17 may be removed and replaced when desired. In the use of this device, it will be understood that gun 10 will be provided with a cartridge whose charge is designed to generate a predetermined explosive force. End face 22 of enlarged portion 15 will be disposed against sample 28. The softest sample that can be tested will be limited by the depth to which ball 17 can be driven before encountering inwardly curved portion 21. If desired, the bottom part containing portion 21 may be enlarged so that ball 17 may emerge.

Figure 2:
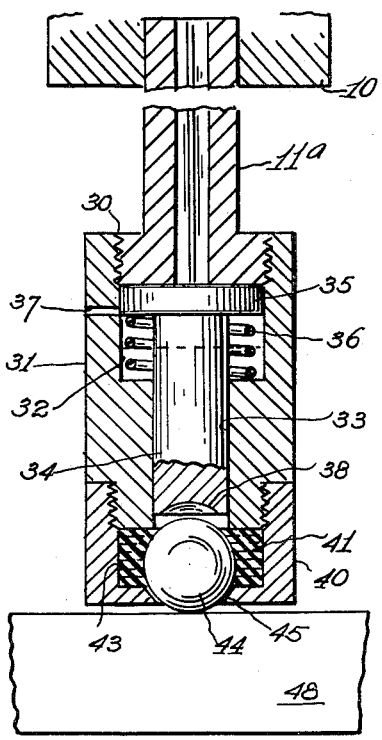
Figures 2, 3 and 4 are sectional elevations of modifications of the invention.

Referring now to Figure 2, a modified construction is shown wherein barrel 11a has outer portion 30 threaded. Disposed over threaded portion 30 is sleeve 31 having chamber 32 and bore 33. Operating within bore 33 is piston 34 having enlarged head 35 within chamber 32. Enlarged head 35 has coil spring 36 underneath the head to bias the piston and head upwardly. Gas vent 37 is provided. Piston 34 has concave end 38. Sleeve 31 has bottom portion 40 cooperating with the adjacent portion of the sleeve to provide chamber 41. Chamber 41 has rubber insert 43 carrying steel ball 44. Portion 40 has apertured part 45 suitably rounded to retain steel ball 44.

Sample 48 is adapted to have ball 44 forced into the sample. It is clear that initially, before the explosion, sample 48 will force ball 44 upwardly against concave end 38 of the piston. When the gun is exploded, head 35 is driven downwardly and forces ball 44 to make an indentation in sample 48. The normal position of ball 44 within limits is not important. Thus rubber insert 43 may force ball 44 against concave end 38 of the piston. It is also possible to have rubber insert 43 position the ball to its outermost position.

Figure 3:
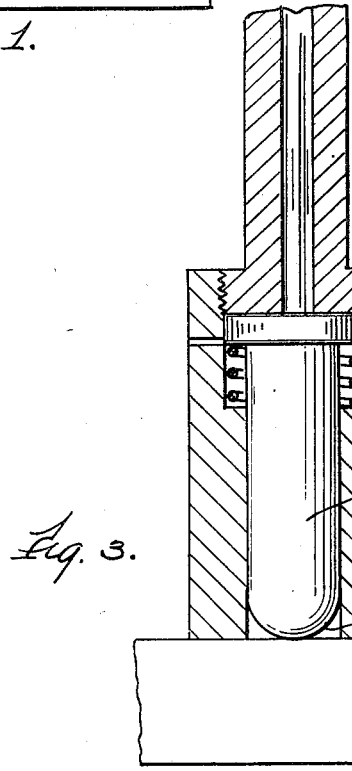

Referring to Figure 3, a still further modification is illustrated wherein piston 34' has rounded tip 44' to function as the indenting element. Rounded tip 44' would have the same hardness and curvature of the steel balls previously discussed. The standards for size and hardness for such indenting members are well known.

Figure 4:
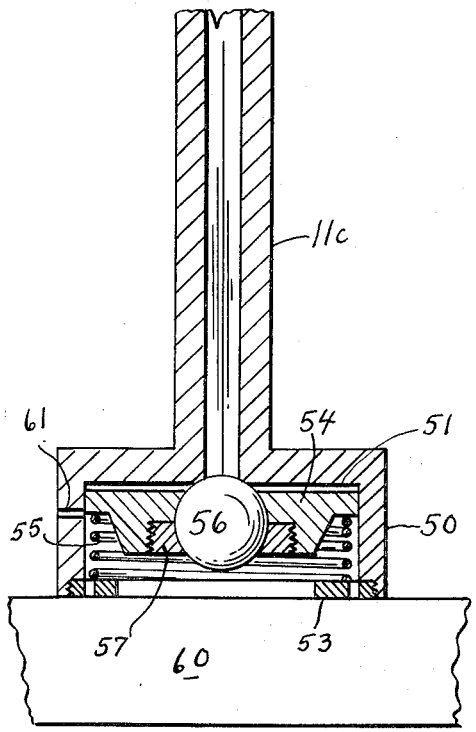

Referring to Figure 4, a still further modification is shown wherein barrel 11c has flaring cup shaped portion 50 providing chamber 51. Cup shaped portion 50 has annular locking ring 53 screwed into the end thereof. Slidingly disposed within chamber 51 is piston 54 biased to the position illustrated in the drawing by coil spring 55. Piston 54 is suitably apertured to accommodate steel ball 56, the ball being locked in position by retaining ring 57 threaded into piston 54. Upon the occurance of an explosion, the gases within barrel 11c will force piston 54 downwardly. The parts are so designed that ball 56 can be forced down far enough to indent sample 60 to a depth determined by the hardness of the sample. A gas discharge vent 61 permits spent gases to escape to atmosphere.

Figure 5:
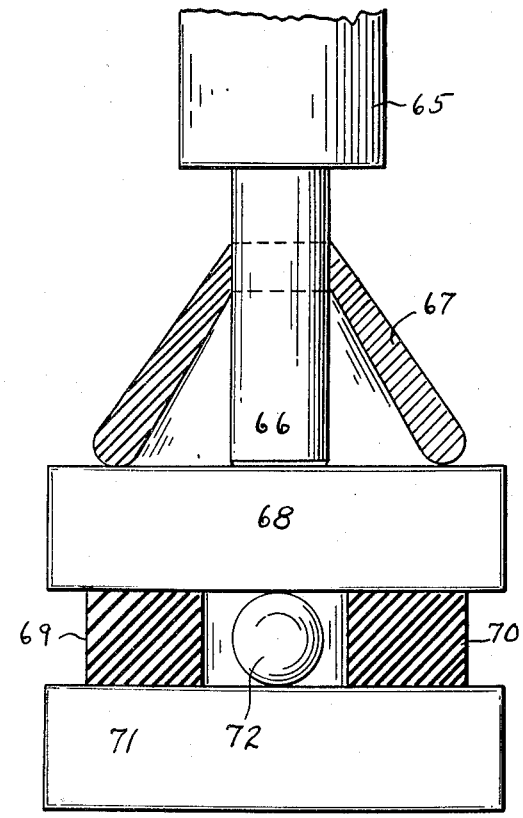
Figure 5 is an elevation partly in section illustrating the application of the invention to indirect Brinell testing.

Referring now to Figure 5, a still further modification is illustrated for use in connection with an indirect Brinell test. Gun 65 having barrel 66 may be generally similar in construction to those used in driving studs. The gun may include skirt 67 for protection. The gun has its muzzle against bar 68 of steel whose hardness is known. Bar 68 rests upon compressible ring or blocks 69 and 70 or rubber or other relatively soft material. Blocks 69 and 70 in turn rest upon sample 71 whose hardness is to be determined. Between bar 68 and sample 71 steel ball 72 is disposed.

Upon the firing of gun 65, ball 72 will create an impression in bar 68 and sample 71. The relative depths of the impressions will vary inversely as the hardness. Since the hardness of bar 68 is known, the hardness of sample 71 may be readily determined.

In order to make the indirect type of test as exemplified by the apparatus illustrated in Figure 5, it is possible to use any of the accessories illustrated in detail in Figures 1 to 4 inclusive. In every one of the figures, bar 68 of known hardness would receive the blow of the rounded steel member. The steel ball 72 would act as above described.

While a number of modifications of the apparatus have been illustrated, it is understood that substantial variations of guns and accessories may be made.

What is claimed is:

In combination, a stud driving type gun utilizing an explosive cartridge having a measured quantity of powder, said gun including a barrel into which the explosive gases are discharged, a metal cylindrical attachment at the end of said barrel for receiving the force of said explosion from said gun barrel, said attachment having a piston and a plunger therein, the piston being exposed to the force of the explosion and the plunger projecting forwardly of said piston, means for biasing said piston and plunger to a rear position from which position the force of an explosion will move said piston and plunger forwardly, a hardened steel ball within said attachment and resilient means for maintaining said steel ball adjacent the forward end of said plunger, said steel ball being adjacent the end of said attachment and adapted to be moved forwardly to clear the end of said attachment for indenting a sample when an explosion occurs for testing the hardness of said sample, the cartridges for such gun having sufficiently uniform effects to provide accurate testing.

References Cited in the file of this patent

UNITED STATES PATENTS

| | | |
|---|---|---|
| 1,708,262 | Davis | Apr. 9, 1929 |
| 2,001,097 | Frickey | May 14, 1935 |
| 2,362,484 | Hickman | Nov. 14, 1944 |
| 2,407,278 | Hodges | Sept. 10, 1946 |
| 2,583,004 | McCorkle | Jan. 22, 1952 |

FOREIGN PATENTS

| | | |
|---|---|---|
| 694,365 | Germany | July 31, 1940 |